Jan. 27, 1942.   H. V. SLADE ET AL   2,271,039
PICKUP OR TONE ARM FOR PHONOGRAPHS AND THE LIKE
Filed May 17, 1941
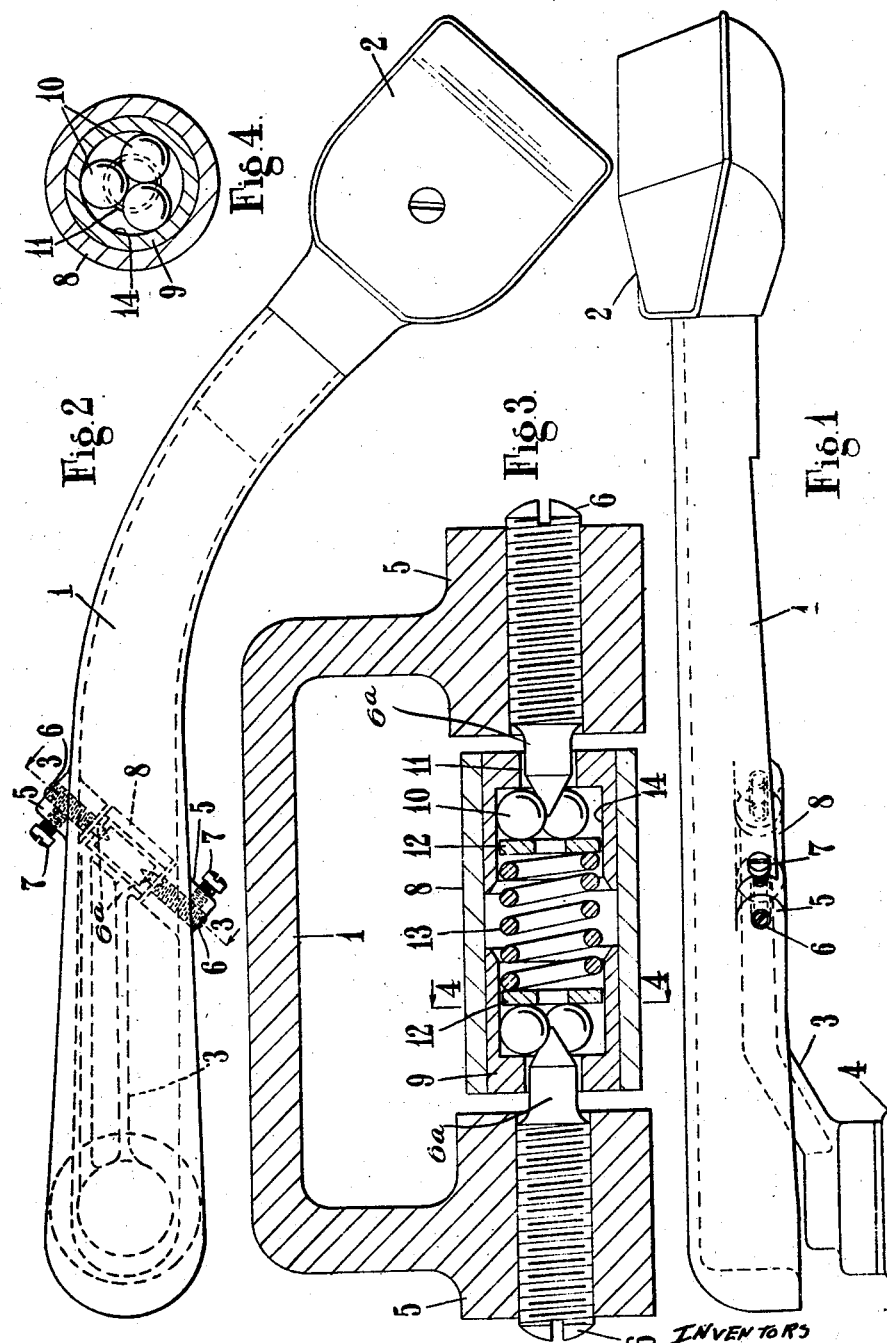
INVENTORS
Herbert Vaughan Slade
Francis John Offen
by Dain J. Means
their attorney Patented Jan. 27, 1942

2,271,039

UNITED STATES PATENT OFFICE 2,271,039

PICKUP OR TONE ARM FOR PHONOGRAPHS AND THE LIKE

Herbert Vaughan Slade and Francis John Offen, Swindon, England, assignors to The Garrard Engineering and Manufacturing Company Limited, Swindon, England Application May 17, 1941, Serial No. 393,878
In Great Britain May 31, 1940

11 Claims. (Cl. 274—1)

This invention relates to pick-up or tone arms as used for phonographs and like apparatus and has for its main object to provide an improved pivotal support for the arm or equivalent member which carries the pick-up or sound-box.

At the present time it is quite usual for the pressure of the needle or stylus upon the record to be relatively small, for example it may be in the neighbourhood of one ounce. Under these conditions the friction of the pivotal mounting which affords the necessary up and down movement to the needle must be very low to ensure that the needle will follow irregularities in the record, while at the same time the mounting must be entirely free from any shake or slackness. To fulfil these requirements involves the use of mounting parts of small size delicately adjusted, and a mounting of this character is not adapted to take the lateral stresses which occur when effecting the necessary swinging movements to the arm or equivalent support. Such stresses may be caused by manual operation of the arm, particularly where the movement is utilised to actuate a starting switch or other control device, and also by inertia effects when the swinging of the arm is performed automatically. The aim of the present invention is accordingly to provide an improved mounting which fulfils the above requirements without being open to the disadvantages mentioned.

According to the invention a mounting for the purpose described comprises pivot parts maintained in co-operating relation by resilient means to afford a low friction bearing and capable of relative displacement upon the application of excessive force to the bearing to transfer such force to other and more robust parts. Thus according to a feature of the invention the mounting may comprise two sets of bearing parts, one of which is a sensitive or anti-friction type of bearing and the other of which is a plain or journal type of bearing adapted to receive the larger stresses transferred thereto from the first bearing.

According to a further feature of the invention the low friction bearing parts comprise cone pivots co-acting with anti-friction members such as balls which are held in position by resilient or spring means. In a preferred construction two sets of balls are held by a common spring means in engagement with a pair of cone pivots which are aligned with their points facing one another.

The yielding of the resilient or spring means allows the applied force to be transferred to other parts which may for example comprise a support or holder for the bearing balls.

In a preferred construction the pivot points or cone pivots referred to above are mounted on the arm and rest upon a bracket which is movable about a vertical axis, and the pick-up casing is supported through the medium of the said pivot points upon a member, preferably tubular, containing the bearing balls and attached to the bracket, the said member being also adapted to provide more robust bearing parts which are spaced from the pivots and to which the applied force may be transferred when this is sufficient to cause relative movement between the resiliently held bearing parts, i. e. the cone of the pivots and the bearing balls. According to a further feature of the invention, the pivots comprise a cone portion or other low friction part and a more substantial part which may be a plain cylindrical portion, the latter being capable of taking the larger forces which cause displacement of the low friction bearing parts.

An example of the preferred manner of carrying the invention into effect will now be described with reference to the accompanying drawing, in which:

Figure 1 is an elevation of an electrical pick-up arm for a phonograph mounted in accordance with the invention, Figure 2 is a plan view of the arm, Figure 3 is a cross-section through the pick-up arm taken on the line 3—3 of Figure 2 and drawn to an enlarged scale, and Figure 4 is a section through the bearing taken on the line 4—4 of Figure 3.

In carrying the invention into effect as applied by way of example to an electrical pick-up arm for phonographs, the arm 1 carrying the pick-up 2 is of that type which is pivotally supported for movement about a horizontal axis at a point intermediate the ends of the arm so that the needle load will be very small. The pivotal mounting is carried by a bracket 3 mounted for movement about a vertical axis of the support 4 to afford the necessary swinging movement of the tone arm. The shape and disposition of this bracket so far as the present invention is concerned, is immaterial.

The arm 1 is of inverted U-shaped cross-section as shown and is formed with a pair of bosses 5, 5, lying on either side thereof which are drilled and threaded to receive threaded pivot pins 6, 6 having reduced portions 6a furnished with cone pivots. Set screws 7, 7 are provided for locking the pins in adjusted position. The disposition of the bosses and pins is such that the points are aligned and their common axis is inclined to the inner portion of the arm 1 so that the said axis is perpendicular to the vertical plane of the pick-up needle. Thus in a straight arm, for example, the aforesaid axis would lie at right-angles thereto.

The swinging bracket 3 carries at the free end thereof a sleeve 8 within the ends of which are mounted two cups 9, 9 containing bearing balls 10. The ends of these cups are formed with bores 11 which surround cylindrical portions of the pivot pins 6 and constitute substantial bearing surfaces which are spaced a short distance from the cylindrical surfaces of the pins 6. The point or cone part of each pin rests upon three bearing balls 10, the size of which is such as to provide the smallest feasible bearing diameter, i. e. about .03 inch. Each set of balls rests upon a plate 12 freely mounted within the respective cup 9, and a helical spring 13 disposed between these plates maintains the balls in engagement with the cone surfaces of the pins. It should be mentioned that the cylindrical bores 14 of the cups 9 closely confine each set of three balls and the diameters are such that free rotation of the balls in contact is permitted.

In assembling the mounting the pivot pins 6 are adjusted to provide a small clearance between the balls and the inner end faces of the cups 9. In this way each ball is afforded a three point bearing contact, and by making the clearance small, any undue side play of the arm is avoided. It will be seen that this arrangement provides a low friction bearing for the pick-up arm which allows a very delicate balancing of the arm without endangering the efficacy of the reproduction. The sensitive type of support provided ensures that the needle will accurately follow the record groove even if the record is warped and the needle load may be safely reduced to a very low value. Such delicate supports are not adapted to withstand the relatively rough handling involved in swinging the arm either manually or automatically for record changing and other purposes, and the invention accordingly provides means for preventing such damage. Upon the application to the arm of a load or force greater than that for which the pivot points are suited, displacement between the cones and bearing balls takes place under the resilient action of the spring 13, and the cylindrical portion of the pivots will be brought into engagement with the cylindrical bores 11 of the cups which afford substantial bearing surfaces adequate to receive the larger stresses. As soon as the force is removed the normal disposition of the bearing parts is resumed, i. e. the balls return to their seating upon the cone points of the pins. The sleeve 8 which contains the bearing balls and the spring may be packed with lubricant.

It will be understood that the details of the arrangement described above may be widely varied. Thus for example the cone pivots might be mounted on the swinging bracket and the bearing ball assembly upon the arm.

We claim:

1. A mounting for a sound reproducing arm comprising low friction pivot parts, resilient means maintaining said pivot parts in co-acting pivotal relation and permitting relative displacement of the parts upon the application of excessive force to the bearing, and other bearing parts adapted to receive the bearing stresses upon the occurrence of such displacement.

2. A mounting for a sound reproducing arm comprising sensitive anti-friction bearing parts pivotally supporting the arm, resilient means for maintaining said parts in pivotal relation, and plain bearing parts of robust construction in spaced relation and arranged to be brought into co-operating bearing relation upon the application to the mounting of a force capable of displacing the sensitive bearing parts.

3. A mounting for a sound reproducing arm comprising cone pivots co-acting with anti-friction bearing members, spring means maintaining said pivots and bearing members in pivoted relation, and plain bearing members in spaced relation arranged to be brought into cooperating bearing relation upon the application of excessive force to the mounting.

4. A mounting for a sound reproducing arm comprising aligned cone pivots with their points facing in opposite directions, bearing balls co-acting with the pivots, common spring means maintaining the pivot points and bearing balls in co-acting relation, and other bearing means in spaced relation arranged to be brought into bearing engagement upon the application of a force to the mounting sufficient to cause relative displacement of the pivot points and bearing balls.

5. A mounting for a sound reproducing arm comprising aligned cone pivots with their points facing inwardly, bearing balls co-acting with the pivots, a tubular member accommodating the bearing balls, spring means for maintaining the pivots and balls in pivotal bearing relation, and means on said tubular member forming bearing parts spaced from said pivots and adapted to be engaged therewith when the force applied to the mounting is sufficient to cause relative movement between the cones of the pivots and the bearing balls.

6. A mounting for a sound reproducing arm comprising aligned cone pivots having a cone portion adapted to afford a low friction bearing part and a cylindrical portion adapted to afford a robust bearing part, bearing balls co-acting with the cones of the pivots, spring means for maintaining the pivots and balls in pivotal bearing relation, and other bearing parts in spaced relation to the aforesaid cylindrical portions of the pivots and adapted to be brought into bearing engagement therewith upon the application of a force to the mounting sufficient to cause relative displacement of the pivot points and bearing balls.

7. A mounting for a sound reproducing arm comprising cone pivots carried upon the arm, a bracket movable about a vertical axis, a bearing housing carried by the bracket, bearing balls within the housing co-acting with the cone pivots to pivotally support the arm, and spring means for maintaining the bearing balls in co-acting relation with the pivots and permitting relative displacement of the parts upon the application of excessive force to the bearing, whereby such force is transferred to other bearing parts adapted to receive the stresses resulting therefrom.

8. A mounting for a sound reproducing arm comprising aligned pivots having a cylindrical portion and a cone portion with their points facing inwardly, bearing balls co-acting with the cone portions, cup members accommodating the bearing balls, a housing member carrying the cup members, common spring means for maintaining the pivots and bearing balls in co-acting relation, washers interposed between the bearing balls and the common spring means, and means associated with said housing member forming bearing parts spaced from said pivots and adapted to be engaged therewith when the force applied to the mounting is sufficient to cause relative movement between the cones of the pivots and the bearing balls.

9. A mounting for a sound reproducing arm comprising aligned pivots having a cylindrical portion and a cone portion with their points facing inwardly, bearing balls co-acting with the cone portions, cup members accommodating the bearing balls, a housing carrying the cup members, common spring means for maintaining the pivots and bearing balls in co-acting relation, washers interposed between the bearing balls and the common spring means, and bearing parts formed on said cup members and in spaced relation to the cylindrical portions of the pivots and adapted to be engaged therewith when the force applied to the mounting is sufficient to cause relative movement between the cones of the pivots and the bearing balls.

10. A mounting for a sound reproducing arm comprising aligned pivots having a cylindrical portion and a cone portion arranged with their points facing inwardly, bearing balls co-acting with the cone portions, cup members accommodating the bearing balls, a housing carrying the cup members, common spring means for maintaining the pivots and bearing balls in co-acting relation, washers interposed between the bearing balls and the common spring means, and end flanges on said cup members forming bearing parts arranged in spaced relation to the cylindrical portions of the pivots and adapted to be engaged therewith when the force applied to the mounting is sufficient to cause relative movement between the cones of the pivots and the bearing balls.

11. A mounting for a sound reproducing arm comprising aligned pivots having a cylindrical portion and a cone portion arranged with their points facing inwardly and carried by the arm, a bracket movable about a vertical axis, a housing carried by the bracket, cups carried by the housing, bearing balls within the cups in co-acting relation with the pivot cones, spring means maintaining such pivotal co-action, and end flanges on the cups forming bearing surfaces in spaced relation to the cylindrical portions of the pivots, whereby an excessive force applied to the mounting causes relative displacement of the cones and bearing balls and the transfer of the force to the cylindrical pivot portions and the flanges of the cups engaged therewith.

HERBERT VAUGHAN SLADE.
FRANCIS JOHN OFFEN.